J. H. CARR AND M. A. POWERS.
LOCK NUT.
APPLICATION FILED FEB. 21, 1921.
1,406,169.
Patented Feb. 14, 1922.
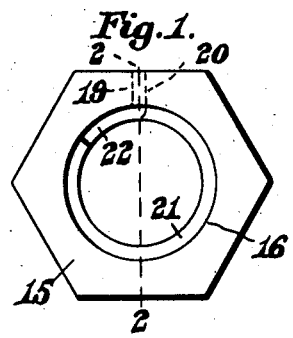
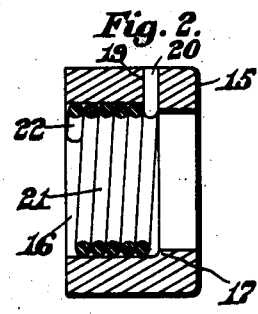
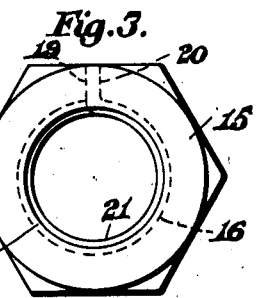
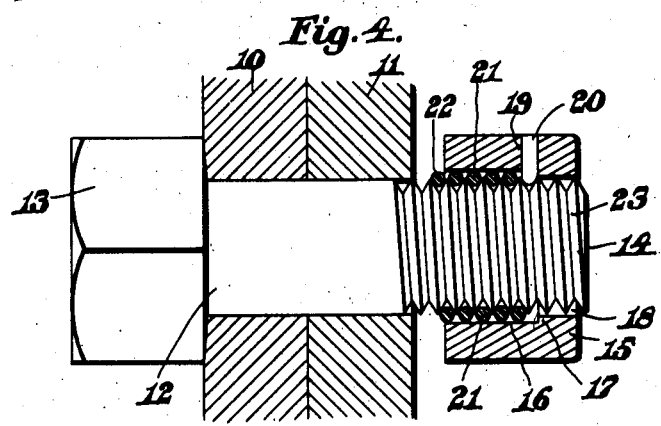
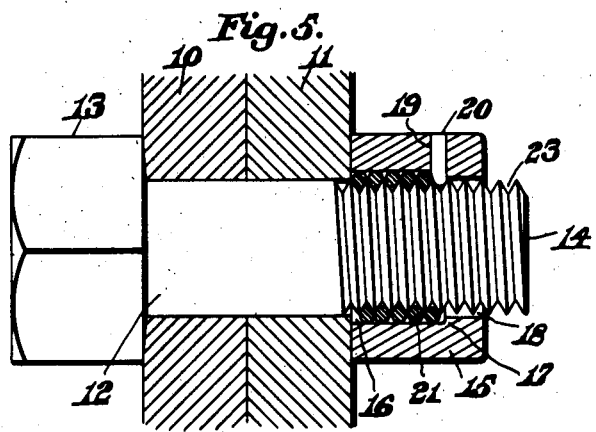
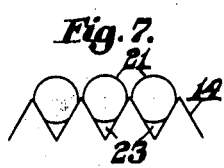
Inventors:
James H. Carr,
Martin A. Powers,
by Walter E. Lombard.
Atty.

UNITED STATES PATENT OFFICE.

JAMES H. CARR AND MARTIN A. POWERS, OF WINCHESTER, MASSACHUSETTS.

LOCK NUT.

1,406,169.  Specification of Letters Patent.  Patented Feb. 14, 1922.

Application filed February 21, 1921. Serial No. 446,794.

*To all whom it may concern:*

Be it known that we, JAMES H. CARR and MARTIN A. POWERS, citizens of the United States of America, and residents of Winchester, in the county of Middlesex and State of Massachusets, have invented certain new and useful Improvements in Lock Nuts, of which the following is a specification.

This invention relates to nut locks and has for its object the production of a device of this character which may be screwed readily onto the thread of a bolt and which when once brought solidly to its seat will be locked so securely that said nut cannot be accidentally removed from the bolt or removed by hand without the application of a great amount of turning pressure upon said nut.

The invention consists of a washer having a central shouldered recess in its inner end in which is positioned a helical spring the end of which, nearest the outer end of the washer, is anchored thereto while the other end is normally within said recess but is adapted to be extended slightly beyond the face of the washer when the lock nut is threaded to a bolt or similar member.

The invention further consists in certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described except as required by the scope of the appended claims.

Of the drawings:

Figure 1 represents an elevation of the inner end of a lock nut embodying the principles of the present invention.

Figure 2 represents a section of same on line 2, 2, on Fig. 1.

Figure 3 represents an elevation of the outer end of same.

Figure 4 represents a section showing two plates to be bolted together and the improved lock nut mounted on the end of the securing bolt.

Figure 5 represents a similar section showing the nut locked to said bolt.

Figure 6 represents a diagrammatic view showing the threads of the bolt and the position of the helixes of the spring when the nut is in the position shown in Fig. 4, and Figure 7 represents a similar view showing the position of said helixes when the nut is in the position indicated in Fig. 5.

Similar characters indicate like parts throughout the several figures of the drawings.

In the drawings, 10 and 11 are two plates or other members which it is desired to secure together by means of a bolt 12.

The bolt 12 is provided with the usual hexagonal head 13 and the opposite end is provided with the usual thread 14.

The lock nut to be applied to the threaded end 14 of the bolt 12 consists of a hexagonal washer 15 having a cylindrical recess 16 in its inner end terminating in a shoulder 17 near its outer end.

The cylindrical wall of the recess 16 is smooth and has an unbroken surface from the shoulder 17 to its opposite end.

The outer end of the washer 15 is provided with an opening 18 having an unbroken cylindrical wall fitting the threaded end 14 of the bolt 12.

This washer 15 is provided with a radial hole 19 adjacent the shoulder 17 in which is positioned one end 20 of a helix 21 of spring wire which wire may be cylindrical in cross section or it may have any other desired cross sectional shape.

The helix 21 is normally wound tight as indicated in Fig. 2 and the free end 22 thereof is under normal conditions wholly confined within the recess 16.

By means of the end 20 of the helix 21 being anchored to the washer 15 by its insertion in the radial hole 19, the helix 21 cannot be accidentally displaced from the washer when removed from the bolt.

The pitch of the helix 21 under normal conditions is slightly less than the pitch of the thread of the bolt to which it is to be applied.

Consequently when the nut is screwed upon the threaded end of the bolt 12, the coils of the spring 21 will be obliged to follow the pitch of the threads 14 and as a result will be separated from each other thereby causing the free end of the spring member 21 to be slightly extended beyond the inner face of the washer 15 all as indicated in Fig. 4 of the drawings.

With the free end 22 of the helical spring 21 extending beyond the inner face of the washer 15 the continued turning of said washer will cause this free end 22 to come into contact with the face of the plate 11 and further movement of the free end 22 of the helix 21 toward the head 13 of the bolt 12 will be prevented.

This continued rotation of the washer 15 will cause the end of the helical spring 21 nearest the shoulder 17 to be moved along the thread 14 of the bolt 12 towards the head 13 thereof while all further movement in the same direction of the free end 22 of the spring 21 is effectually prevented.

As a consequence of this movement of one end of the helix while the other end is restrained from movement the tendency is to increase the diameter of the coils of the helix 21 but as the helical spring 21 fits nicely the cylindrical wall of the recess 16, this expansion is impossible and consequently the various coils are forced into the V-shaped groove 23 and are jammed against the walls thereof (as indicated in Fig. 7) so that great frictional contact between said helixes and the walls of the grooves 23 is created. At the same time the coils of the helix will be forced into firm contact with the cylindrical wall of recess 16 in the washer 15.

The more the washer 15 is rotated clockwise by means of a wrench, the greater will be the frictional contact between the coils of the helical spring 21 and the walls of the thread 14 and also between said coils and the washer 15.

This results in locking the washer 15 to the bolt 12 in such a manner that it not only cannot be accidentally displaced therefrom but it cannot be displaced from the thread 14 without destroying the spring 21.

This is due to the fact that when the various coils of the helical spring 21 are jammed into the V-shaped groove 23 and against the wall of recess 16 such frictional contact is attained that when the washer 15 is rotated contra-clockwise the outer end of the helical spring will be moved along the thread 14 without affecting in any manner the grip of the inner coils of the helical spring 21.

This device is intended for use only when parts are desired to be permanently locked together by means of a lock nut which cannot be removed from the bolt without destruction of the helical spring.

It is particularly adapted for use in connection with motor cars and the like.

When it is desired to remove the washer by applying great force thereto, the springs will be destroyed or distorted to such an extent as to be useless while the threads of the bolt will remain uninjured, this being due to the fact that the helical spring is made of softer material than the threads of the bolt 12.

When a lock nut has been thus removed, the distorted or broken spring is removed therefrom and a new spring is inserted within the recess of the washer and then said washer may be applied again to the thread of the bolt 12.

The helical springs are inexpensive and it is the intention to keep a supply of the same on hand to replace any springs which when once applied are destroyed in the removal from the bolt.

When the nut is applied to a bolt it has every appearance of an ordinary threaded nut and as the opening 18 closely fits the threaded end 14 of the bolt 12, it is impossible for anyone to tamper with the helical spring confined within the washer 15.

This makes a permanent lock for bolts which is simple in construction and very effective in operation.

It is believed that the operation and many advantages of the invention will be understood without further description.

Having thus described our invention, we claim—

1. A lock nut comprising a washer having at its inner end a cylindrical recess terminating in a shoulder, and a helical spring in said recess having a pitch less than that of the thread of the bolt on which said washer is to be mounted and anchored to said washer at a point near the outer end of said washer.

2. A lock nut comprising a washer having at its inner end a cylindrical recess terminating in an annular shoulder, and a helical spring anchored to said washer near the outer end of the latter and normally wholly confined within said recess, said spring having a pitch less than that of the thread of the bolt on which said washer is to be mounted.

3. A lock nut comprising a washer having at its inner end a cylindrical recess terminating in an annular shoulder, and a helical spring anchored to said washer near the outer end of the latter and normally wholly confined within said recess, said spring being adapted to be extended when applied to the thread of a bolt having a pitch greater than that of said spring.

4. A lock nut comprising a washer having an opening in its outer end with an unbroken cylindrical wall adapted to fit a threaded bolt and a slightly larger recess in its inner end, a helical spring in said recess, said spring having an inner diameter less than that of said opening, and a pitch less than that of the thread of the bolt on which said washer is to be mounted, and means for securing the inner end of said spring to said washer.

5. A lock nut comprising a washer having an opening in its outer end with an unbroken cylindrical wall adapted to fit a threaded bolt and a slightly larger recess in its inner end, a helical spring in said recess, said spring having an inner diameter less than that of said opening, and a pitch less than that of the thread of the bolt on which said washer is to be mounted, and a radial end to said spring extending through a hole in the washer at the inner end of said recess.

6. A lock nut comprising a washer having a helical spring mounted therein and secured thereto at one end to prevent relative movement of said spring and washer while permitting the free end of said spring to be extended when applied to the thread of a bolt having a pitch greater than that of said spring.

7. A lock nut comprising a washer having a recess with an unbroken cylindrical wall, in which recess is mounted a tightly wound helical spring anchored at one end to the washer and adapted when applied to the thread of a bolt having a greater pitch than that of said spring to have its opposite end extended slightly beyond the face of said washer to impinge upon the face of a member in which said bolt is mounted and with which said nut coacts.

Signed by us at 746–7 Old South Bldg., Boston, Mass., this 18th day of February, 1921.

JAMES H. CARR.
MARTIN A. POWERS.

Witnesses:
WALTER E. LOMBARD,
NATHAN C. LOMBARD.